April 1, 1947. E. R. TAYLOR 2,418,145
SIGNALING SYSTEM
Filed Feb. 3, 1943 5 Sheets-Sheet 1

FIG. 1

INVENTOR
E. R. TAYLOR
BY
ATTORNEY

FIG. 2

April 1, 1947. E. R. TAYLOR 2,418,145
SIGNALING SYSTEM
Filed Feb. 3, 1943 5 Sheets-Sheet 3

FIG. 3

INVENTOR
E. R. TAYLOR
BY
ATTORNEY

April 1, 1947. E. R. TAYLOR 2,418,145
SIGNALING SYSTEM
Filed Feb. 3, 1943 5 Sheets-Sheet 5

FIG. 5

INVENTOR
E. R. TAYLOR
BY
ATTORNEY

Patented Apr. 1, 1947

2,418,145

UNITED STATES PATENT OFFICE 2,418,145

SIGNALING SYSTEM

Edmund R. Taylor, Pelham Manor, N. Y., assignor to Bell Telephone Laboratories, Incorporated, New York, N. Y., a corporation of New York Application February 3, 1943, Serial No. 474,531

10 Claims. (Cl. 179—16)

This invention relates to signaling systems and more particularly to a signaling system in which means are provided for transmitting and receiving, over a suitable transmitting medium, alternating current pulses composed of a combination of frequencies preferably within the voice frequency range.

The main object of the invention is the provision, in a receiving circuit adapted to receive and amplify alternating current impulses composed of a combination of frequencies lying within a comparatively narrow signaling band, of means for reducing the quantity of amplified energy at the beginning of each pulse below a predetermined value, and to increase this energy automatically after a predetermined interval to the desired level for operating the responsive devices of the receiver.

In alternating current receivers, particularly those employing volume limiters to control the energy applied to the responsive devices of the receiver, it has been found that where the pulses are generated at the transmitting end of the line by keying devices, the chatter of the contacts often causes the production of transients which are abnormally large. Ordinarily the "ceiling" of the volume limiter is fixed at a value sufficiently high for the receiver to accept pulses coming over the line with rather large loss frequency distortion. The intensity of the transient currents produced by contact chatter, on the other hand, is so high that, although the frequencies composing the disturbance are similarly attenuated during their transmission, the value of some frequency therein, even if leveled off by the ceiling of the limiter at its established value, is still sufficiently high to cause false operation of one or more of the receiver's responsive devices.

To overcome this undesirable condition, my invention provides a controllable network which is easily adaptable to any alternating current receiver utilizing a volume limiter, and by means of which the ceiling of the limiter is normally held below the level at which transient disturbances produced by contact chatter and amplified to said level can cause any false operation of the receiver. The network is provided with an electrical timing device which may be suitably adjusted to cause the limiter to be held at the protective low level for the duration of the transient disturbance which forms the advance portion of the pulse, subsequent to which the amplification of the limiter is then automatically raised to the level appropriate to the passage of the remainder of the pulse.

Another object of the invention which is accomplished by my proposed network is the control, in receivers with volume limiters that use screen grid tubes, of the amplification factor of the tubes so that maximum effectiveness is obtained from their operation at the initial protective low level of amplification and at the ultimate high level of amplification. It is well known, for example, that for the maximum effectiveness at any level of amplification there is an optimum relationship between the plate voltage and the screen potential of a screen grid tube, and that if the level of amplification is changed and maximum effectiveness is desired at the new level, the plate and screen voltages must be readjusted with respect to each other to the values indicated for that level. By means of my invention, the network which controls the lowering and the raising of the limiter ceiling, which it accomplishes by lowering and raising, respectively, the available potential across the cathode-anode electrodes of the limiter tubes, automatically and simultaneously readjusts the screen potentials to values precalculated to be those required for the particular potential differences then applied across the cathodes and anodes of the tubes.

These and other objects of the invention will be more readily ascertained from the following description and appended claims, taken in connection with the following drawings, in which:

Fig. 5 shows an alternative arrangement of settable registers; while

It will be readily understood by those skilled in the signaling arts that a signaling system arranged for transmitting and receiving alternating current impulses is adaptable to a wide variety of uses, especially indicated by the application to be made of the intelligence conveyed by the impulses transmitted over the system. My invention may, of course, be utilized in any alternating current receiver in which it is desired to automatically lower and raise the level of amplification for the purposes mentioned or for any other purpose, and in order to describe the elements of the invention, its operation and its flexibility, I have chosen to disclose it in connection with its adaptation to a telephone system of the kind described in Patent No. 2,232,912, issued to G. Hecht, A. A. Lundstrom, and E. R. Taylor on October 26, 1943, in which a calling subscriber, desiring a connection with a distant station which can only be reached by trunking facilities available at an operator's position in an office within the dialing area of the calling subscriber, dials the operator who, upon receiving from the calling subscriber the office and line number of the desired station, selects a trunk extending in the desired direction and causes a group of alternating current impulses indicative of the called office and station designations to be transmitted thereover into settable apparatus at the office in which the trunk terminates, wherefrom this apparatus then controls the selective positioning of a suitable number of switches by means of which the trunk connection is further extended to the desired station. It is obvious, however, that while this application of the invention will illustrate its purpose, scope and operation, the invention itself is susceptible of other uses readily appreciated by those skilled in the signaling art.

Referring, now, to the drawings, the subscriber A establishes a connection to the operator's position within his dialing area by the well known means referred to in said above mentioned patent and, at said position herein referred to as the "transmitting station," informs the operator thereat that he desires to establish a connection to subscriber B whose station terminates in office Y, which can be reached from the transmitting station over a trunk line that interconnects said transmitting station with office X and by automatic trunking facilities between office X and office Y which are selectively connectable to the trunk therebetween by equipment at office X which operates in response to the receiving circuit subsequent to the latter's response to the impulses transmitted over the trunk from the transmitting station. The operator, upon learning of the desired office and station from the calling station A, selects an available trunk, say the trunk which terminates in jack JA having the conductors T and R extending to the office X, and, by suitable equipment disclosed in said copending application causes conductors SCT, and SCR. of the key-set KS at her position to become connected through the right-hand plug of the cord and jack JA to conductors T and R, respectively, of the trunk thus taken into use.

The key-set KS at the operator's position comprises a series of digit keys 0–9, a key ST and a key KP, and all of said keys are suitably wired to six separate sources of alternating current frequencies $a \ldots f$ within the voice frequency range, in a manner such that the depression of each of the keys will cause two of the frequencies to be applied across conductors T and R of the trunk via conductors SCT and SCR in the following combinations through circuits completed from the sources of frequencies involved and the undesignated resistances connected to the stationary springs of the keys:

| Key | Frequencies |
| --- | --- |
| 0 | a, b |
| 1 | a, d |
| 2 | b, d |
| 3 | d, e |
| 4 | b, e |
| 5 | c, d |
| 6 | a, c |
| 7 | b, c |
| 8 | c, e |
| 9 | a, e |
| KP | c, f |
| ST | e, f |

At office X, the trunk selected by the operator automatically causes the connection thereto of an idle "register sender" over suitable selecting equipment, for example, a sender selector device SS comprising a cross bar switch and circuits for the control thereof. Into this register sender is incorporated the receiving circuit to which my invention is applied; that is, the circuit which receives the alternating current impulses that will be transmitted by the operator through the manipulation of the key-set KS, and this receiving circuit, upon receiving the impulses, first checks them for accuracy and then causes them to become set up on groups of settable registers connected to the receiver. From the registers, the registration therein is then transferred to a "marker" circuit and the marker, in response to the transferred registration, then controls the operation of a cross bar trunk selector TS by which the trunk T, R, between the transmitting station and office X, is selectively positioned into connection with another trunk that extends between office X and office Y, at which latter office the sender at office X then transmits over the trunk to a sender in office Y pulses that designate the called number, whereupon said sender at office Y then initiates operations by which the connection is further extended to the terminals of the called line.

In view of the fact that the sender and marker are well-known equipment elements now extensively utilized in automatic telephony, and since the present invention is confined to a signaling system the receiving portion of which is incorporated in such a sender only by way of disclosing the parts, principles and operation of the receiving circuit, neither the sender nor the marker is disclosed except by conventional indications, the disclosure of the sender being confined to the incorporated signal-receiving circuit in its entirety and to a schematic showing of typical settable registers operating in response thereto.

Figures 1, 6:
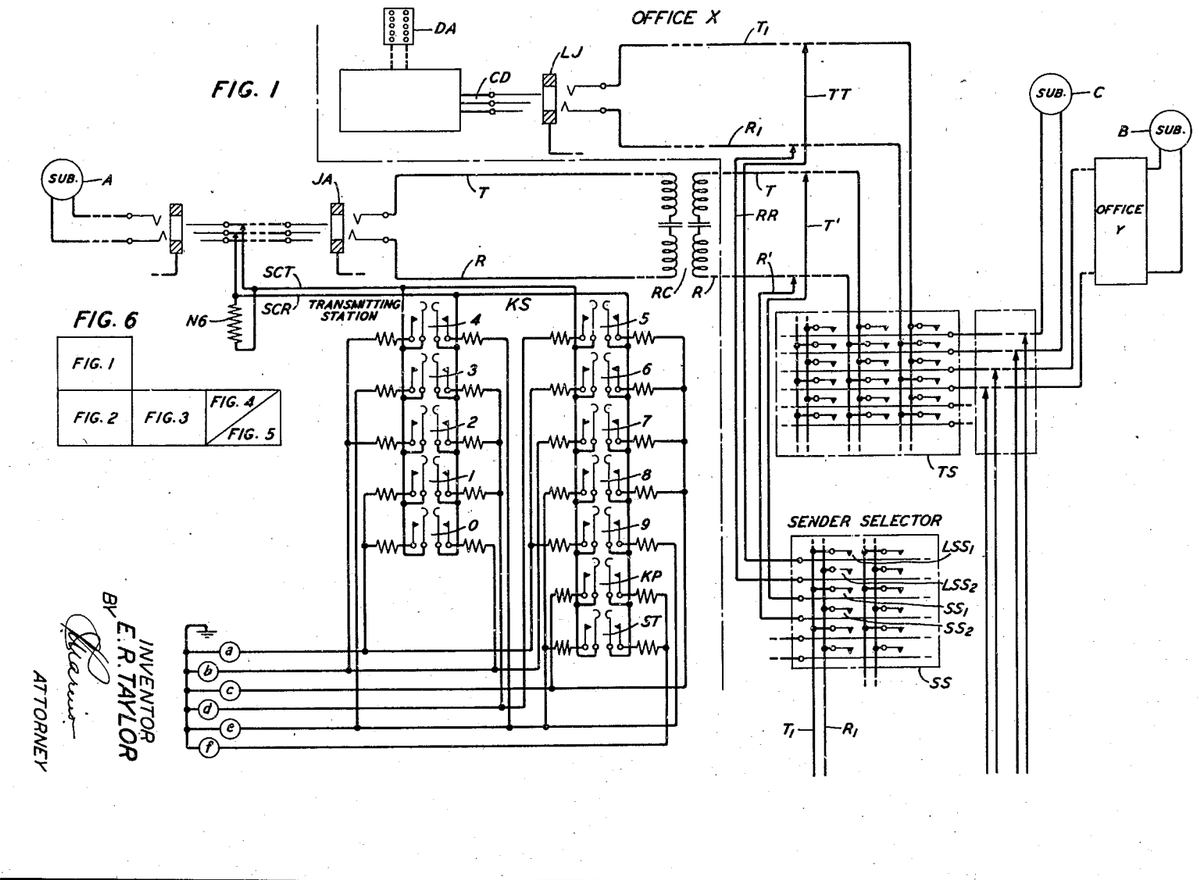
Fig. 1 shows the transmitting station, a trunk line to which such station may be connected, selecting apparatus by means of which the receiving circuit of the invention may be connected to the trunk and to the transmitting station; and a skeletonized showing of two telephone connections which may be established by settable apparatus responsive to the operation of the receiver.
Fig. 6 shows the manner in which Figs. 1 to 5, inclusive, are to be disposed relative to each other in order to disclose the invention completely.
Figure 2:
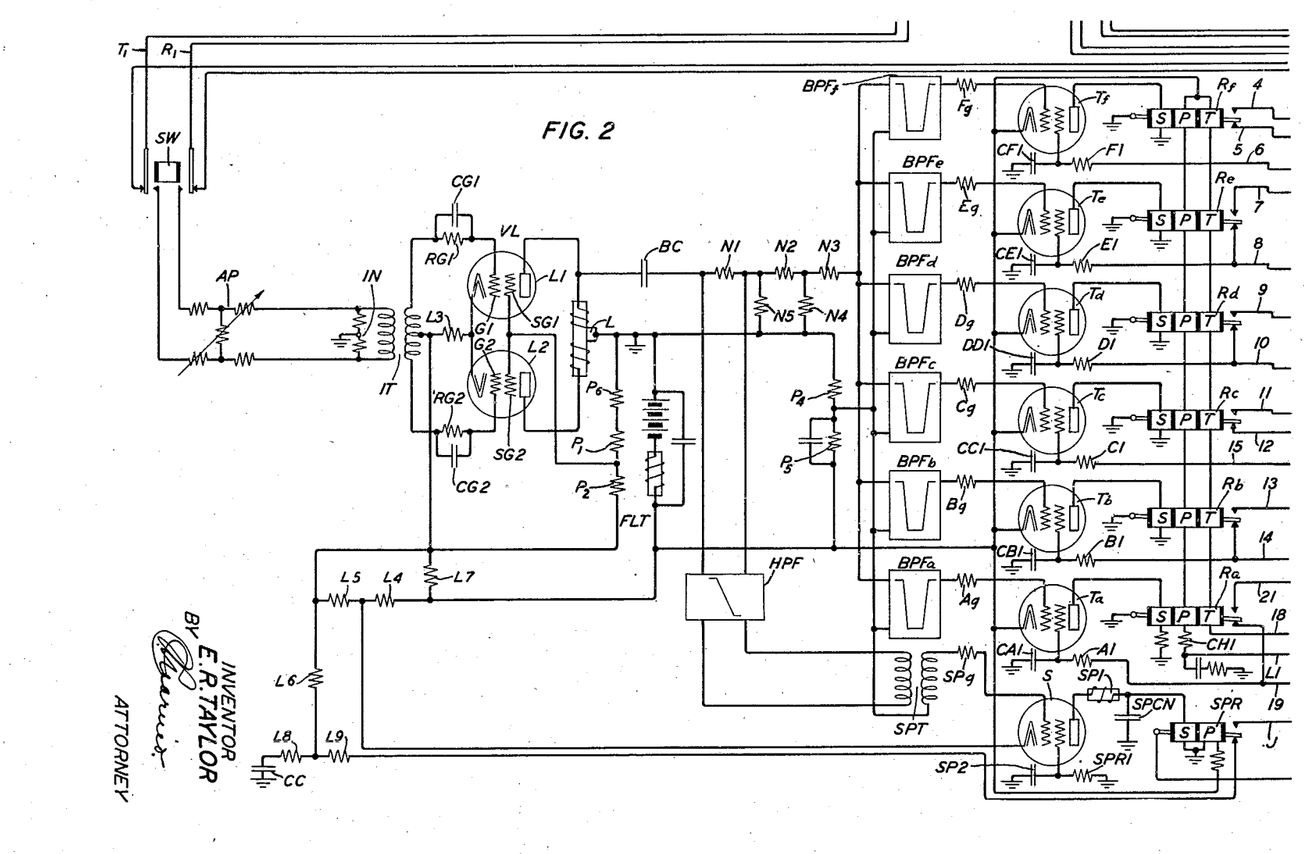
Fig. 2 shows the amplifier and detector circuit of the receiver incorporating the network of my invention.
Figure 3:
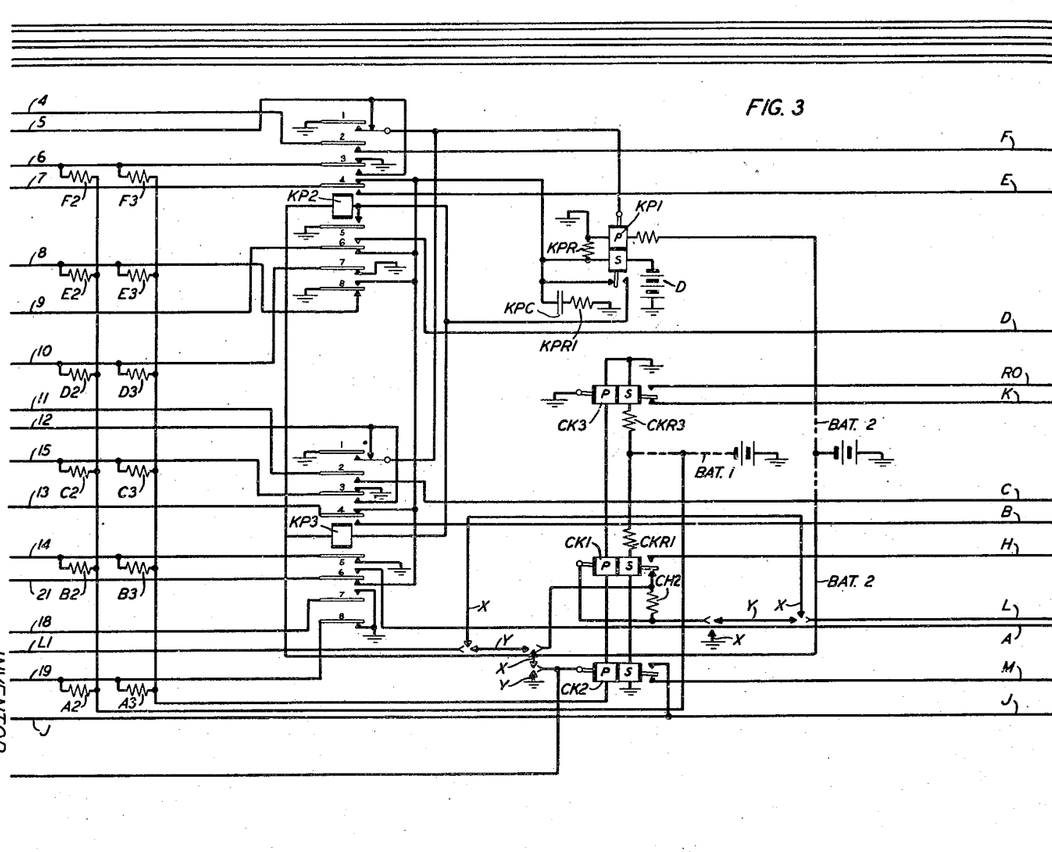
Fig. 3 shows the "check" circuit for checking the accuracy of the received impulses and the circuit which responds to the conditioning or "KP" impulse.

The receiving circuit to which my invention is applied by way of illustration, is shown in Figs. 2 and 3, and is essentially a circuit for translating alternating current signal impulses consisting of various combinations of frequencies sent out from the transmitting station two at a time, into direct current indications suitable for registration in an associated settable register which comprising a part of the sender, operates in response to the registration to complete the call in the usual manner.

The receiver comprises a volume limiter VL; a "signal present" channel including the high-pass filter HPF, transformer SPT, a vacuum tube S, a polarized relay SPR and associated circuit; a plurality of receiving channels, one for each frequency in the entire signal band $a \ldots f$, each of which comprises a band-pass filter BPF—, a vacuum tube T— and a polarized relay R— such as, for instance, the channel reserved for frequency $a$ which is made up of band-pass filter $BPF_a$, a vacuum tube $T_a$ and a relay $R_a$. The network of my invention by which the amplification level of the limiter VL is automatically raised from its initially low protective level to its normally high receiving level and by which the screen potentials for the tubes L1 and L2 of the limiter are automatically adjusted to appropriate values for each case, comprises the resistances L3, L4, L5, L6, L7, L8, L9, P6, and condenser CC, all wired in the interrelated manner shown in Fig. 2; the "key-pulse" signal circuit comprises relays KP1 . . . KP3 and associated circuits which operate in response to the initial operations of relays Rc and Rf of the channels reserved for frequencies $c$ and $f$, respectively, when the key KP is operated at the transmitting station as hereinafter set forth; and the check circuits comprise relays CK1 . . . CK3 and associated networks which operate in the manner hereinafter set forth to check the pulses as they are received by the various channels affected by the frequencies in the impulses.

The alternating current signals, which are alternating current voltages available across conductors T and R of the trunk after the initial transients are dissipated, are received and applied to the input elements of the receiving circuit after relay SW is operated in any suitable manner. The input elements of the receiving circuit comprise the adjustable pad AP, which is a means for adjusting the sensitivity of the receiving circuit to the minimum required since, by keeping the sensitivity as low as possible, the likelihood of false operation on currents which may be produced by speech or noise is materially reduced; the terminating resistance IN, the center tap of which is grounded; and the input transformer IT, the input winding of which is connected to the terminals of resistance IN and the output winding of which is connected to the common terminal of resistance RG1 and paralleled condenser CG1, and the common terminal of resistance RG2 and paralleled condenser CG2. The other common terminal of resistance RG1 and condenser CG1 is, in turn, connected to grid G1 of vacuum tube L1 while that of resistance RG2 and condenser CG2 is connected to grid G2 of vacuum tube L2.

The volume limiter VL comprises the pentode vacuum tubes L1 and L2 and their associated input and output circuits. The tubes are operated in the well-known "push-pull" relation with the output of their respective anodes connected together by means of retardation coil L and delivered, through the blocking condenser BC and resistance N1, to resistance N5. The volume limiter provides adequate amplification of the incoming alternating current impulses to cause operation of the desired channels but, however, limits its output signal voltage to such a value that channels other than those intended to be responsive to the frequencies in the signal will not operate on the transient currents generated at channel filter outputs of filters $BPF_a$ . . . $BPF_f$ by said signals when they start and stop.

The limiting action of the volume limiter VL is obtained by means of the control grid resistances and condensers RG1, CG1, and RG2, CG2 connected, respectively, to the grids of the tubes L1 and L2, which resistances and condensers cause the grid bias to become more negative when the alternating signal voltage on the grids becomes high enough to cause them to draw current during the positive half waves. When this condition is reached, the power output of the limiter becomes approximately constant regardless of further increases in the grid voltage. The actual point at which limiting occurs is controlled by the bias voltage on the screen grids SG1 and SG2, by the bias voltage on the control grids G1 and G2, by the inherent limitation on maximum plate current with zero control grid potential and, of course, by the particular screen grid and plate potentials. The desired value of bias potential for the screen grids is obtained from the potentiometer consisting of resistances $P_1$, $P_2$ and $P_6$. The grids G1 and G2 are held negative in the normal condition by the voltage drop across the cathode resistance L3.

The output of the limiter VL is divided into two parts by the resistances N1 and N5. The voltage across the resistance N1 is applied to the "signal present" circuit which, as before stated, comprises the high-pass filter HPF, input transformer SPT, vacuum tube S and polarized relay SPR. This circuit responds to the small voltage developed across resistance N1 in consequence of any signal transmitted from the transmitting station, which signal, being stepped up by the input transformer SPT, is applied to the grid of the pentode vacuum tube S, which functions as a rectifier by virtue of the normal positive grid bias and of the resistance $SP_g$ in its control grid circuit. The high-pass filter HPF is employed in the "signal present" channel to suppress the unwanted frequencies below the signal frequency band which may be present in the body of the signal. Since the currents produced by the line noise increase in intensity as they decrease in frequency, the probability of falsely operating the signal present channel from this source is reduced. The signal voltage across resistance N5 is passed through the resistance network comprising resistance elements N2, N3 and N4 to the inputs of filters $BPF_a$ . . . $BPF_f$ which act to separate the signaling frequencies into the bands corresponding to the mid-band frequencies $a$, $b$, $c$, $d$, $e$ and $f$, respectively.

The resistance network N2, N3 and N4 serves a three-fold purpose: (1) it provides attenuation to afford the desired relationship between channel sensitivity and the output of the volume limiter VL; (2) it provides a relatively constant impedance termination between the filters and the widely varying output impedance of the volume limiter; and (3) it attenuates transient disturbances reflected back from the filters to such an extent that they do not cause objectionable chatter of relay SPR.

The control grid of the tube S is normally held positive by the voltage obtained from the potentiometer made up of resistances $P_4$ and $P_5$. This positive bias, together with the reduced screen grid voltage obtained by the use of resistance SPR1 connected to the screen grid of tube S, improves the operation of the circuit and reduces the effect of tube variations. Condenser SP2 is provided to by-pass the alternating current around resistance SPR1. Relay SPR has its secondary (S), or bias, winding connected in the plate circuit of the tube S, while its primary winding (P), or operate, winding is connected to battery through the low resistance filtering retard coil FLT. When there is no signal present on the trunk and, therefore, no signal voltage is being applied to the grid of the vacuum tube S, the plate current flowing through the bias winding of the relay SPR is sufficiently large to overcome the effect of the current in the operate winding and the relay remains normal; that is, with its armature resting on its lower contact. But when an alternating current signal is applied to the grid of the tube, the plate current is reduced due to the change in the potential of the grid, and the current through the operate winding (P) of the relay SPR overcomes the reduced current through the secondary winding (S) and causes the relay to operate and move its armature into engagement with its upper contact.

The plate circuit of the tube S includes retard coil SP1 and condenser SPCN. These serve two purposes: first, to reduce modulation products that would cause the relay SPR to chatter and, second, to slow up the operate and release times of relay SPR by delaying the dying down and building up of the plate current through the secondary winding of said relay. These delays compensate somewhat for the fact that there is no band-pass filter in the signal present channel, as compared, for example with filters $BPF_a \ldots BPF_f$ in the signal channels, and aid in preventing the operation of said signal channels by transients since, as subsequently set forth, without the operation of relay SPR, signal channel relay operation cannot take place.

Figure 4:
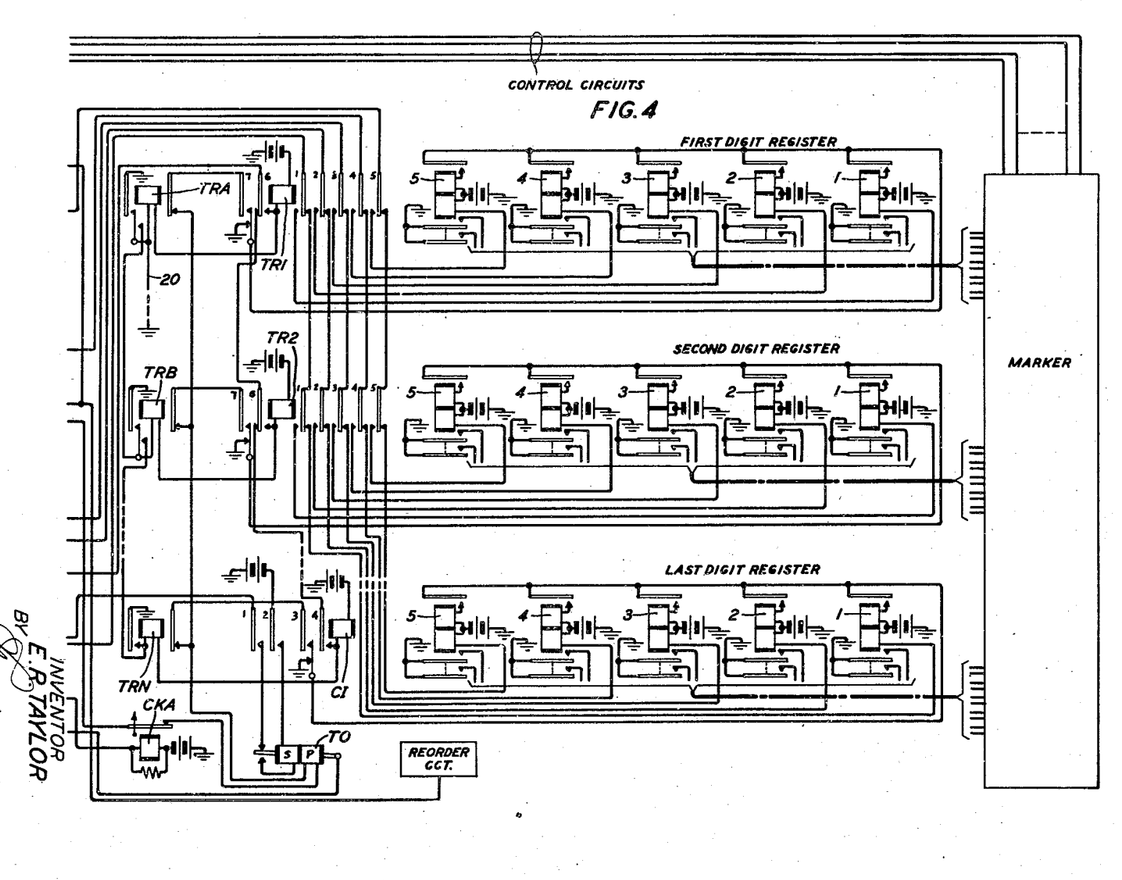
Fig. 4 shows a group of conventional registers settable in response to the received impulses, and a conventional showing of a circuit known as a "marker" which is adapted to operate in response to the setting of some of the registers to aid in the selective positioning of switching apparatus by which parts of the telephone connections shown in Fig. 1 may be set up.

Referring now to the register of Fig. 4, and X wiring in the portion of the receiving circuit shown in Fig. 3, the armatures of relays SPR and CK2 are multiplied together and obtain ground via the back contacts of relay CK1. The front contacts of relays SPR and CK2 are also multiplied and connected to conductor J, which extends to the armature of the polarized relay TO. From this relay, this conductor is extended via the armature and upper contact of said relay and the No. 1 contacts of relay CI, which is assumed to be operated in a manner that will be described hereinafter, to conductor L, conductor L1 and thence to the operate (P) windings of relays $Ra \ldots Rf$. Hence when relay SPR operates in response to a signal forthcoming over the rtunk, it applies ground serially over conductors J and L1 to the operate windings (P) of all of the channel relays $Ra \ldots Rf$, preparing the same for operation when their associated channels will have responded to the frequencies in the signal as hereinafter set forth. It may be noted that when relay CK2 operates as described later, it has the same effect as relay SPR, and also that when relay CK1 operates, it removes a short circuit from resistance CH2 and thus inserts this resistance in the ground being supplied to the armatures of relays SPR and CK2, the purpose of which will be explained later.

Figure 5:
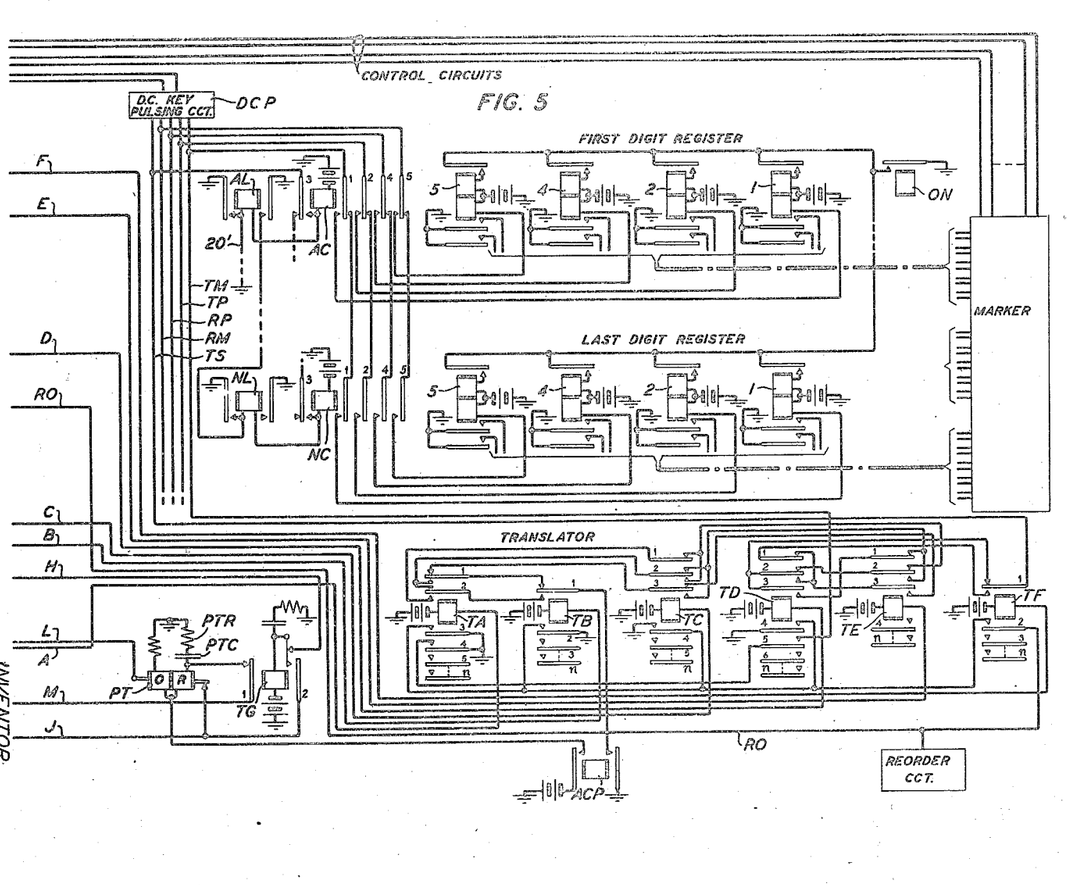

When the register of Fig. 5 is used, however, and Y wiring is provided in Fig. 3, the armatures of relays SPR and CK2 are grounded and their upper contacts are multipled together and connected to conductor J which is extended to the bottom contact of polarized relay PT and to the No. 2 armature of relay TG. From the former relay, this conductor is extended via the armature of said relay to conductor L, which is connected to resistance CH2 and to the armature of polarized relay CK1. It will be noted, however, that the operate windings (P) of the channel relays $Ra \ldots Rf$ are connected to conductor L1, which is connected to the other end of resistance CH2 and to the lower contact of relay CK1, so that it joins conductor L either directly through the armature and back contact of relay CK1 when said relay is released, or via resistance CH2 when said relay is operated. Hence when relay SPR operates in response to a signal forthcoming over the trunk, or when relay CK2 operates as hereinafter described, ground is applied serially over conductors J, L and L1 to the operate windings (P) of all the channel relays $Ra \ldots Rf$, preparing the same for operation when their associated channels will have responded to the frequencies in the signal as hereinafter set forth.

Since the "signal present" circuit is connected to the volume limiter VL ahead of the channel filters $BPF_a \ldots BPF_f$ (by virtue of its connection across the terminals of resistance N1), relay SPR will be operated when any signal of sufficient magnitude is available at the output of the limiter, whereas the channel relays $Ra \ldots Rf$ will be operated only when frequencies passable through their associated channel filters are present in the signal. Now in any signaling system where speed of transmission is essential to insure the maximum utilization of a minimum quantity of apparatus, and the signals are transmitted under manual control of a kind that the signals and the time interval between the signals may not be of uniform duration, it is necessary to register a received signal as quickly as possible upon appropriate settable register relays connected to the contacts of the channel relays, to prepare the channels for reception of the next signal by releasing the operated channel relays immediately the registration is completed, to connect the contacts of the channel relays to the next settable register even though the signal is still present, and yet prevent a duplicate registration of the original signal on this next settable register. The "signal present" circuit, in connection with a circuit controlled by the settable registers as hereinafter set forth, insures the correct performance of these functions by providing means that will cause the operate circuits of the channel relays to remain open once they are opened even though the signal is still present, and will cause them to remain open until the signal is terminated.

In order to understand how these and other functions are performed, the description of the remaining elements of the receiver will be given in connection with their operation.

When a sender is seized via the sender-selector apparatus SS and connected to the trunk taken into use by the operator at the transmitting station, conductors T and R of the trunk are connected to the signaling conductors T' and R' and thence via the sender-selector to leads T1 and R1, respectively, of the receiver circuit incorporated in the sender, and operations are then initiated in the sender whereby positively grounded battery is connected to conductors BAT1 and BAT2, it being understood that suitable sources of current (not shown) have already been or are continuously connected to the filaments of all the electronic tubes of the receiver. Battery on conductor BAT1 completes an obvious circuit through the secondary (S), or bias, windings of polarized relays CK1, CK2 and CK3 thereby causing the energization of these windings but not the operation of their respective relays, the normal condition of each of which may be assumed to be with its armature engaged with the lower contact as shown. Battery over conductor BAT1 is also connected to resistances $A2 \ldots F2$ in preparation for changes in the potential applied to the screen grid electrodes of the channel vacuum tubes Ta ... Tf. Battery on conductor BAT2 completes an obvious circuit to the primary winding (P) of polarized relay KP1, but this relay remains with its armature engaged to its left contact because the secondary winding (S) of the relay is also energized from battery D connected directly thereto, completing a circuit over its left contact and armature, normally made No. 1 contacts of relays KP2 and KP3, conductors 5 and 12, and the lower contacts and armatures of relays Rc and Rf to ground. Battery on conductor BAT2 is also connected to the windings of relays KP2 and KP3 in preparation for their subsequent operation as described hereinafter.

When the receiving circuit is thus cut through to the transmitting station at the beginning of a call, there is a brief period during which it may be exposed to speech or noise currents which, if the receiving circuit were ready to receive signal frequency impulses, might cause it to operate falsely and thereby cause a false setting of the first settable register ordinarily connected to the front contacts of the channel relays. To prevent this, the receiving circuit is normally held in a condition whereby signal impulses cannot be registered until after a definite timed impulse consisting of frequencies c and f is received, which impulse is transmitted from the transmitting station by the operation of key KP thereat which, over its left contacts, causes frequency source c to be applied to conductor SCT and, over its right contacts, causes frequency source f to be applied to conductor SCR. These conductors, across which resistance N6 is bridged to supply a matched terminating impedance for the trunk during the time that it is connected to the keyset KS, join with trunk conductors T and R, respectively, and cause circuits to be completed over the left windings of repeating coil RC. The currents of frequency c and f flowing over this path cause similar currents to be induced in the path including the right windings of the repeating coil RC, the trunk conductors T and R, the conductors T' and R', the contacts SS1 and SS2 at the sender selector cross bar switch SS, conductors T1 and R1, the front contacts of relay SW, which is assumed to have been operated in any suitable manner, and thence through the pad AP, the left winding of transformer IT with the mid-grounded resistances IN bridged thereacross. The signal voltage thereby developed in the left winding of transformer IT is induced into the right winding, amplified through the limiter VL, and then applied, partly across resistance N1 and partly across resistance N5, the former being applied to the left winding of transformer SPT of the "signal present" circuit and the latter, through resistances N2, N3 and N4, to the input terminals of the channel filters BPFa ... BPFf. Since only the filters BPFc and BPFf are each tuned to pass one of the two frequencies in the signal c and f, respectively, the voltage thereof is applied to the grid electrodes of vacuum tubes Tc and Tf through resistances Cg and Fg but not to any other channel tubes.

Now each of the channel tubes Ta ... Tf (which are pentode tubes) is provided with a positive grid bias from positive battery through coil FLT and resistances P4 and P5, and a control grid resistance Ag ... Fg, respectively, to make each of said tubes function as detectors. Each channel is also provided, as before stated, with its own individual relay Ra ... Rf, the secondary winding (S) of each of which is connected in the anode circuit of its associated vacuum tube. The primary windings (P) of these channel relays are connected in series and obtain battery through filter coil FLT. The other end of the series connection of the primary windings (P) of relays Ra ... Rf is connected to resistance CH1 and thence to conductor L1 whence it traces back to the upper contact of relay SPR as already shown.

It has been stated that the grids G1 and G2 of tubes L1 and L2, respectively, are held negative in the normal condition by the voltage drop across resistance L3. The voltage between the cathodes and anodes of these tubes is also partly controlled by the potential drop in resistance L3 but, in addition, is also controlled by the drop in the entire network of resistances L4, L5, L6, L7 and L9 connected to resistance L3, said network being connected to ground through resistance L9, normal contacts of relay SPR, direct to ground (Y wiring) or through the normal contacts of relay CK1 (X wiring) to ground. Since the battery source is through coil FLT and said battery is grounded at its positive pole and, therethrough, is connected to the anodes of the tubes L1 and L2, it is evident that the available potential difference between the cathodes and anodes of these tubes depends upon the condition of the signal present relay SPR. With this relay normal, as would be the case prior to the transmission of a signal, resistances L6 and L9 are serially connected to the common terminal of resistances L5 and L7, the latter resistance being in parallel with resistances L4 and L5. Consequently before the transmission of a signal, the circuit path for the cathode-anode circuit of both tubes may be traced from ground and battery through coil FLT, resistance L7 in parallel with resistances L4 and L5, resistance L3, through the cathode-anode of both tubes L1 and L2 to ground through the upper winding of coil L for tube L1, and through the lower winding of said coil for tube L2. At the common terminal of resistances L5 and L7 there is a parallel branch of this circuit which extends through resistances L6 and L9 to aforetraced ground through the normal contacts of relay SPR.

With the above circuit arrangement it is evident that the potential drop in resistance L3, together with resistance L7 in parallel with resistances L4, L5, will be determined in part by whether or not the parallel branch made up of resistances L6 and L9 is electrically a part of the circuit by the application of ground to resistance L9 via the normal contacts of relay SPR. When this relay is normal, the drop across resistance L3 plus the drop across resistance L7 in parallel with resistances L4 and L5 is larger than when the relay is operated because, in the former case, the parallel network of resistances L7 and L4, L5 will draw through itself not only the current which traverses the path including resistance L3 to ground through the cathode-anode of the tubes, but also the current which traverses the path through the parallel circuit including resistances L6 and L9 to ground. When relay SPR operates, this latter parallel circuit is opened and, therefore, the full voltage of the battery is then available only for the network of resistance L7 in parallel with resistances L4 and L5 serially through resistance L3. Hence the voltage available across the cathode-anode of each of the tubes L1 and L2 is less when relay SPR is normal than when it is operated. This means, of course, that the amplification ceiling of the limiter tubes L1 and L2 is lower when relay SPR is normal and higher when it is operated.

It will further be noted that the potential applied to the screen electrodes SG1 and SG2 of the tubes L1 and L2, respectively, is controlled by the potentiometer made up of resistances P1, P2, and P6 to ground at one end and to the terminal of resistance L7 on the other. The value of the resistances P1, P2 and P6 is so computed that the potential available at the screen electrodes SG1 and SG2 when relay SPR is normal will insure maximum effectiveness of tube operation for the potential difference then available across the cathode-anode electrodes of these tubes. When relay SPR operates, the potential at the upper terminal of resistance L7 is, of course, different and higher than before, so that, by virtue of the current now drawn through the potentiometer to ground, the potential available at the screens is higher and of the correct correlated value to insure maximum amplification with the cathode-anode potential difference then available across the cathode-anode electrodes of tubes L1 and L2.

Thus, by virtue of the control exercised by the parallel branch L6, L9 of the above circuit network, the amplification ceiling of the volume limiter may be alternately raised and lowered with the operation and release, respectively, of relay SPR. And by virtue of the potentiometer P1, P2 and P6, the screen potential applied to the tubes of the amplifier will also be raised and lowered with the operation and release of relay SPR to the correct values required for the voltage applied in each case across the cathode-anode of each tube of the limiter.

Returning, now, to the operation of the circuit, the operator will depress the key KP before depressing any of the digit keys. It may be assumed that the key contacts will chatter for a brief interval before making a solid closure and that, during the chattering period, the transient voltage produced by the application of signal frequencies $c$ and $f$ (or any combination of signal frequencies) through the contacts will be applied to the line. This voltage will, of course, be applied to the control grids G1 and G2 of the volume limiter and will be amplified thereby, some of the amplified voltage being made available across resistance N1 and thence across transformer SPT to cause the operation of tube S and the consequent operation of relay SPR, and the rest of the amplified voltage being available across the network N5, N2, N3 and N4 for application to the channels. However, it will take some time to operate relay SPR after a part of the transient voltage is applied to transformer SPT, and this time definitely exceeds the duration of the transient. Consequently, during the time that the transient voltage is applied to the receiver, the amplifying factor of the limiter is at the lower ceiling fixed by the voltage across the cathode-anode electrodes of its tubes L1 and L2 as determined by the potential drops in resistances L3, and L7 in parallel with resistances L5 and L4, and resistances L6 and L9 in series with said parallel combination. And although the transient voltage is amplified, yet the amplification level is below that which is necessary to operate any of the channel tubes T—. Tube S, however, does operate on the portion of the amplified transient voltage made available across resistance N1 because its sensitivity is higher, due to the fact that the voltage across its cathode and anode is made larger by the application to the cathode of the full negative potential of the battery through the comparatively low resistance coil FLT and resistance L4.

The transient voltage generated by the chattering of the contact keys will be followed by the steady voltage subsequently available through the key contacts. But subsequent to the termination of the transient voltage relay SPR operates, either as a consequence of the duration of this voltage or as a consequence of its duration plus the duration of the pure signal voltage that follows. With the operation of relay SPR, the ground connection to resistance L9 is broken, and for the reasons previously advanced, the voltage across the cathode-anode of each of the volume limiter tubes L1 and L2 is now raised and the potential at the screens thereof is appropriately altered, both thereby raising the amplification ceiling of the volume limiter to the full value required for channel response to the undistorted signal voltages.

It will be noted that the serial network of condenser CC and resistance L8 is joined at the common terminal of resistances L6 and L9 and that condenser CC is grounded. This network is provided to insure that the increase in amplification of the volume limiter subsequent to the operation of relay SPR takes place gradually in order to avoid the production of other objectionable transients by the sudden rise in current. During the time that relay SPR is normal, ground is applied to the right terminal of resistance L9 and since the value of this resistance L9 is low compared to that of resistance L6, condenser CC is practically in the uncharged state. Upon the operation of relay SPR subsequent to the dissipation of the transient voltage applied to the line, ground is disconnected from the right terminal of resistance L9 and a charging circuit is established for the condenser extending from battery through the winding of coil FLT, resistances L4, L5, L6 and L8 in series, condenser CC to ground. During the time that the condenser is becoming charged, the potential at the upper terminal of resistance L7 gradually rises and the difference of potential between the cathodes and anodes of tubes L1 and L2 is gradually increased until the condenser is fully charged, at which time said difference of potential is increased to the full value required for high ceiling amplification.

Returning, now, to the operation of the receiver, when the operator depresses key KP and the transient voltage developed by the chattering of the key contacts as above set forth is fully dissipated, a part of the undistorted signal voltage derived from the signal frequencies $c$ and $f$ is applied to transformer SPT to cause the operation of tube S and that of its anode relay SPR which, upon operating, applies ground to conductor J and thence to conductors L and/or L1, resistance CH1 and the primary windings (P) of the channel relays Ra...Rf, while the remaining voltage is applied (through the respective filters BPFc and BPFf) to the grid electrodes of tubes Tc and Tf, respectively. The application of the latter voltage to the grid electrodes reduces the value of the positive potential between grid and cathode normally thereon from battery through coil FLT and network P4 and P5. In consequence, the respective anode currents flowing through these tubes and the secondary (S), or bias, winding of relays Rc and Rf are reduced, causing these two relays to operate on the current through their operate winding (P), the circuit of which may be traced from battery through the filter FLT, serially through the primary winding (P) of all the relays Ra...Rf, resistance CH1 and thence as already traced to ground on the contacts of relay SPR. It will be noted that the current which causes the operation of relays Rc and Rf, while flowing through the operate winding (P) of all the channel relays as well, yet will only cause the operation of the two relays Rc and Rf. The reason for this is because the current in the secondary (S) winding of each of the other channel relays has not been diminished by any material alteration in the control grid potentials of their respective associated tubes.

With relays Rc and Rf thus operated, ground is disconnected from conductors 5 and 12, which remove ground from the secondary winding (S) of relay KP1, the path of the ground being by way of the No. 1 normally made continuity contacts of relays KP2 and KP3 and through the armature and left contact of relay KP1.

Relay KP1 now operates slowly over an obvious circuit through its operate (P) winding, the slowness of its operation being due to the charging current for condenser KPC flowing through its secondary winding (S) and resistance KPR1, which current opposes the current flowing through the primary (P) winding. When the condenser KPC is completely charged, the current flowing through the winding (S) of the relay is limited by the high resistance KPR, and since the resulting magnetic flux is smaller than that produced by the current flowing through the primary (P) winding, the relay is caused to operate.

Resistance KPR is provided to insure that the armature of relay KP1 shall always engage its left contact when the circuit is idle. If this resistance were omitted, the removal of battery from conductor BAT2 during the time between the breaking of the left contact of relay KP1 and the operation of relays KP2 and KP3 would leave the circuit blocked since condenser KPC would be charged and no current would be flowing in the secondary winding (S) of relay KP1 to release it.

Now when the "KP" signal is terminated by the release of key KP after the required interval to operate relay KP1, or by any other suitable means such as, for instance, a simple timing circuit responsive to the depression of key KP and adapted to keep frequencies c and f on the trunk conductors for the required interval, the release of either relay Rc or relay Rf will cause ground to be connected to conductors 5 or 12, respectively. Since these two conductors are joined at the No. 1 normally made contacts of relays KP2 and KP3, and since relay KP1 is now operated, the ground on conductor 5 or 12 (or both) is applied to the windings of relays KP2 and KP3 via the armature and right contact of relay KP1. Since battery is connected to the other terminals of the windings of each of these two relays by conductor BAT2, both relays will operate and lock to ground on the No. 5 contacts of relay KP2. (The No. 1 front contacts of relays KP2 and KP3 maintain the ground via the armature and contact of relay KP1 as relays KP2 and KP3 operate.) Relay KP2, over its No. 8 front contacts, now reapplies ground to the secondary winding (S) of relay KP1, increasing the current flow therethrough in consequence thereof and causing relay KP1 to release and reestablish its armature into engagement with the left contact.

Relays KP2 and KP3, upon operating, perform the general function of extending the upper contacts of the channel relays Ra...Rf to conductors A...F, five of which, in the register of Fig. 4, extend through contacts on a previously operated "steering" relay TR1 to the lower windings of the relays of the first digit register in which the first operations of the relays Ra...Rf in the proper combinations will be registered. In the register of Fig. 5 an extra translating step is required, as explained hereinafter, so the six registering conductors A...F are connected directly to the windings of six "translating" relays, the contacts of which are connected through contacts on a previously operated steering relay AC to the lower windings of the relays of the first digit register. With either arrangement, subsequent operations of relays Ra...Rf in the proper combination will be registered in the first and succeeding groups of register relays. Relays KP2 and KP3, upon operating, also remove ground from the vacuum tube side of the resistances A2, A3...F2, F3 but ground is still maintained on each pair of resistances (as for example, resistances A2, A3) through the lower contact of each channel relay to maintain the screen-grid electrode of the corresponding channel tube at the required potential. As explained in detail later, when the circuit is in this condition the screen grid potential of each channel tube T— is changed when the corresponding channel relay operates, whereas in the original condition the operation of the channel relays has no such effect. In addition, relay KP3, over its No. 7 contacts and conductor 18, supplies ground to the serially connected tertiary windings (T) of all the channel relays Ra...Rf. These tertiary windings are poled to oppose the primary windings (P) of said relays and, for certain operations described hereinafter, function to release the relays.

As previously indicated, it is necessary that frequencies c and f be received for a definite length of time without frequencies a, b, d or e, if the circuit is to unlock; that is, if relay KP1 is to operate and relays KP2 and KP3 are to operate in consequence of the operation of relay KP1. If an impulse containing one or more of these latter frequencies should appear at any time before relays KP2 and KP3 will have been operated, the corresponding channel relay, or relays, will, of course, operate and apply ground to the secondary winding (S) of relay KP1 and to condenser KPC via the No. 4 and No. 6 back contacts of relays KP2 and KP3, or any of them. This ground restores the full bias current to the secondary (S) winding of relay KP1, and if this relay had already started to operate (because, say, of the presence of frequencies c and f in the extraneous impulse along with the other frequencies), it will restore immediately because of the full bias current produced by ground on the secondary winding (S), and condenser KPC will discharge to said ground in preparation for a new timing cycle. If relay KP1 is normal when the extraneous impulse appears, the application of ground to the secondary winding (S) of relay KP1 simply causes the relay to remain in its unoperated position; that is, with its armature engaged with the left contact. In either case, the net result is that the channel relays Ra...Rf remain ineffective for the purpose of registering their operated condition until frequencies c and f appear concurrently by themselves and by themselves only for the necessary length of time, since, with relays KP2 and KP3 normal, the front contacts of the channel relays are not cut through to the register, and the channel relays themselves which were operated by the impulse will restore when the impulse is terminated since, with the removal of the grid potential from the associated tube by the termination of the impulse, the full plate current is restored which, flowing through the secondary winding (S) of the associated channel relay will cause the latter to restore. It will be noted that during these operations, the screen grid electrode of each tube remains grounded through appropriate contacts of relays KP2 and KP3 and, therefore, will have no effect upon the intensity of the plate current when the signal potential is removed from the grid. That is, prior to the reception of the "KP" signal, the channel relays Ra ... Rf are free to operate and release in acccordance with the application and removal of the incoming alternating current signals. The reason for this is because the screen grids of the several channel tubes, being grounded at the contacts of relays KP2 and/or KP3, are powerless to change the intensity of the associated plate currents when the latter increase to their normal strength upon the removal of impulse potential, in consequence of which the several channel relays restore to normal in response to the preponderating bias current flowing through their respective secondary (S) windings. After the "KP" signal has been received, however, and relays KP2 and KP3 have been operated in consequence thereof, the direct ground formerly supplied via some of their back contacts to the screen grid electrodes of all the channel tubes is removed and these electrodes are then connected to ground only as long as their respective channel relays remain on their back contacts. The result is that, when a channel relay operates, the screen grid potential of its associated vacuum tube is changed in such a way that the relay is locked up. This locking action is caused by the fact that when a channel relay operates, after the anode current flowing through its bias winding (S) has been reduced sufficiently by the incoming signal, the operated relay, by causing its grounded armature to break with its associated back contact, removes ground from the screen grid of its associated vacuum tube and causes the latter to be connected to a potentiometer which supplies a much lower voltage than normal between screen grid and cathode, in consequence of which the plate current of the tube remains reduced after the signal has terminated and the control grid electrode has been restored to its normal potential.

Thus if we assume that a signal made up of frequencies $a$ and $b$ is transmitted before the "KP" signal of frequencies $c$ and $f$ and, therefore, before relays KP2 and KP3 are operated in consequence of the latter signal, the signal voltage due to the signal composed of frequencies $a$ and $b$ is applied to the control grids of channel tubes Ta and Tb, respectively, and the current through their respective anode circuits (including the secondary (S) windings of relays Ra and Rb) is reduced and relays Ra and Rb operate on the current flowing serially through their primary winding. When operated, relay Ra opens one of the two paths by which ground reaches conductor 19, and relay Rb opens one of the two paths by which ground reaches conductor 14. However, since relays KP2 and KP3 are normal, ground is still applied to the screen grid electrode of tubes Ta and Tb via conductors 19 and 14, respectively, over contacts 8 and 5, respectively, of relay KP3. The presence of ground on these electrodes will cause the reduction of the anode current to be determined exclusively by the potential of the signal applied to the control grids of the respective tubes so that, when the signal ceases, the anode current is restored to its original value and relays Ra and Rb release. When, however, a signal comprising any two of the frequencies $a$ ... $f$, say frequencies $a$ and $c$, is transmitted after the operation of relays KP2 and KP3 and the consequent removal of ground supplied over their back contacts to leads 8, 10, 14, 15 and 19, the corresponding channel relays Ra and Rc operate as before but, in so doing, remove ground from the screen electrodes of their respective tubes Ta and Tc. With ground removed these electrodes are connected to a potentiometer made up of resistances A2 and C2, A3 ... F3, and the (P) windings of relays CK1 ... CK3, as follows: Resistances A2 and C2 extending to battery over conductor BAT1, while resistances A3 and C3 extend to ground via a circuit consisting of the serially connected primary windings (P) of relays CK1, CK2 and CK3 shunted by the four resistances B3, D3, E3 and F3 in parallel. The potential applied by this network to each of the screen grid electrodes of the tubes Ta and Tc is lower than that available thereto by the previous ground connection and this will cause a further reduction in the anode current. When the signal voltage ceases, the control grids are restored to their normal positively biased state, but since a low potential is still available at the screen grid electrodes from the potentiometer network, the anode current is still reduced in spite of the restoration of the control grid electrodes to their normal state, thereby causing relays Ra and Rc to remain in an operated condition until their operate (P) windings are opened.

It will be noted that when relay KP2 operates, it applies ground over its No. 8 contacts to the secondary winding (S) of relay KP1 and to condenser KPC in the same way as the channel relays Ra, Rb, Rd, and Re when and if they, or any of them, operate on an alternating current impulse prior to the appearance of the timed "KP" impulse composed of frequencies $c$ and $f$. This ground causes relay KP1 to release and condenser KPC to discharge as above described, but the release of this relay does not interfere with the operated condition of relays KP2 and KP3 since these relays are now locked to ground on the No. 5 contacts of relay KP2. The purpose of this arrangement is to make sure that the timing circuit, comprising relay KP1 and condenser KPC, is normal and ready to give a complete timing cycle on the next call. A sequence adjustment of the No. 5 contacts of relay KP2 insures that these contacts close ahead of the No. 8 front contacts which release relay KP1.

As already stated, the alternating current signal code impulses consist of various combinations of two frequencies $a$ ... $f$ transmitted simultaneously according to the code previously given. In the receiving circuit, each frequency (after the transient voltage is dissipated and the ceiling of the volume limiter VL is raised as previously described) finds a path through its corresponding filter to the grid of one of the vacuum tubes Ta ... Tb and causes the operation of the associated relays Ra ... Rf. After the operation of relays KP2 and KP3 by the "KP" impulse signal which, as above noted, is transmitted ahead of the digital impulse codes, the operation of one or more of relays Ra ... Rf causes ground to be applied to the corresponding conductors A ... F which connect with the settable registers or the translating relays associated therewith, causes ground to be removed from the corresponding resistances A2 ... F2 to reduce the voltage on the screen grids of the associated vacuum tubes, causes the operated channel relays to lock in consequence thereof as already described and, further, allows current to flow through the primary windings (P) of relays CK1, CK2 and CK3 in an amount almost directly proportional to the number of relays Ra ... Rf which are operated. It will be noted that, prior to the reception of the "KP" signal, relays CK1, CK2, CK3, cannot function because they are, in effect, short-circuited by ground supplied to leads 6, 8, 10, 14, 15 and 19 from the back contacts of relays KP2 and KP3.

Relays CK1, CK2 and CK3 are all polarized relays. The operate current through the respective primary windings (P) and the bias currents through the respective secondary windings (S) are so proportioned that none of them will operate when a single channel relay Ra ... Rf is operated. Relays CK1 and CK2 will operate, however, when two of said channel relays operate because of the increase in current through the primary winding (P), and relays CK1, CK2 and CK3 will operate when three or more of said channel relays operate because of a still higher increase in the current through their respective primary windings (P). Thus, for example, if, after the transmission of the "KP" signal and, therefore, after the operation and locking of relays KP2 and KP3, the operator were to depress the digit key 1 to put forth upon the trunk an impulse consisting of frequencies a and d, said impulse would cause the operation of relays Ra and Rd, in consequence of which ground would be removed from the screen grid electrodes of channel tubes Ta and Td and, also, from conductors 19 and 10. Now while the current flowing through the secondary windings (S) of relays CK1, CK2 and CK3 is fixed and determined by the ohmic resistance of each of said windings and the ohmic resistance of resistors CKR1 and CKR3, the current that will now flow through the primary windings (P) is determined by the ohmic resistance of said separate windings and by the number of parallel paths to battery BAT1 which will be formed through resistances A2, A3 ... F2, F3 by the operation of the number of channel relays. In the case assumed, relays Ra and Rd are operated; consequently, the current through the primary windings (P) of relays CK1, CK2 and CK3 is determined by resistances A2 and D2, and A3 ... F3, the actual path tracing from ground, serially through the primary windings (P) of relays CK1, CK2 and CK3, with resistances B3, C3, E3 and F3 in shunt therewith to ground, resistances A3 and A2 to battery BAT1 and, in parallel therewith, through resistances D3 and D2 to battery BAT1. The quantity of current flowing through this circuit will produce sufficient magnetic flux in the relays to overcome the flux due to the current flowing through the secondary windings (S) of relays CK1 and CK2 and will cause said relays to operate, but this current will not produce sufficient flux to overcome the current through the secondary winding (S) of relay CK3 which, on this account, remains unaffected. Relays CK1 and CK2 will remain operated until ground is reapplied to conductors 19 and 10 on the release of relays Ra and Rd, which will be described later.

Should there be three frequencies in a digital impulse, say frequencies a, d and c, then relay Tc will operate along with relays Ta and Td, and ground will be removed from one side of resistances C2, C3 whereupon the circuit of relays CK1, CK2 and CK3 will take on an additional parallel branch through resistances C2, C3 to battery BAT1, resistance C3 being removed as a shunt around relays CK1 ... CK3, and the current flowing through the primary windings (P) of relays CK1, CK2 and CK3 will be increased so that, this time, the flux will be sufficient to overcome the flux due to the current flowing through the secondary winding (S) of relay CK3, which will now operate along with relays CK1 and CK2. Relays CK1, CK2 and CK3, therefore, serve to check each of the incoming signals and, as will be shown, will advise the sender whether or not it should register these signals.

Considering the operation of the receiver in connection with the settable registers of Fig. 5 (and Y wiring in Fig. 3), the operation of relay CK2 removes ground from conductor M and applies it to conductor J in parallel with the ground applied to this conductor by relay SPR. Relay CK1, when operated, removes a short circuit around resistance CH2 and effectively adds this resistance in series with the primary windings (P) of the channel relays Ra ... Rf, by inserting said resistance between conductor L1 and conductor L, the latter joining conductor J at the contacts of relay PT. With the primary windings (P) of relays Ra ... Rf connected through resistance CH1 to ground, the circuit has its full sensitivity, but after relay CK1 operates and resistance CH2 is inserted in series with resistance CH1, the sensitivity is somewhat reduced. The reason for this slight decrease in sensitivity is to increase the protection against false operations on transients and cross-modulations which may appear in the unoperated channels. Relay CK1 also applies ground from relays SPR and/or CK2 via conductors J and L as traced above, to conductor H, in consequence of which a circuit is completed for relay TG over its No. 2 normally made continuity contacts, causing said relay to operate and lock over its No. 2 front contacts to ground on conductor J. Relay TG performs a function which will be shortly described.

As previously indicated, the path between conductor J and conductor L is closed in the sender at the start of each digit and remains closed until the sender opens it, after the registration of each digit, by the operation of relay PT, as hereinafter described, whereupon the channel relays are released by virtue of the fact that the circuit of the primary windings (P) of the channel relays is opened at the contacts of relay PT. Once this has occurred, the path to the primary windings (P) of the channel relays remains open and the channel relays remain released until relays SPR and CK2 both release and remove ground from conductor J, since, until this occurs, relay TG remains locked to prevent the release of relay PT. It will be noted, however, that, although the path to the primary windings (P) is opened at the contacts of relay PT, the operation of relay KP3 has applied ground over its No. 7 contacts to conductor 18 which is connected serially to the tertiary winding (T) of the channel relays, the circuit thereof being completed to battery through retard coil FLT. Now the tertiary winding (T) of each channel relay is connected so that the current flowing through it as a result of the circuit closed by the operation of relay KP3, is in a direction to release the relay; that is, the current is in a direction to aid the bias or secondary (S) winding and to oppose the current flowing through the primary (P) winding. Consequently, when the primary circuit is opened at the contacts of relay PT, the operated channel relays will release, either in consequence of the current flowing through their respective tertiary windings (T) if the signal impulse is not terminated, or in consequence of the resultant effect of the current flowing through their respective tertiary windings (T) and the current flowing through their respective secondary windings (S) if the signal impulse is terminated. Although current will, of course, flow through the tertiary windings (T) of the channel relays when current is also flowing through their primary windings (P), the combined effect of the reduced current in the secondary winding (S) of the relays affected by a signal frequency and the current flowing through their respective tertiary windings (T), will not be sufficient to overcome the current flowing through their respective primary windings (P). Consequently said relays will remain operated until the primary circuit is opened at the contacts of relay PT. Those channel relays which do not have a signal voltage applied to the grid of their respectively associated channel tubes will have full current flowing through their respective secondary windings (S) so that these relays will remain in a released condition. Prior to the operation of relay PT as described hereinafter, the ground applied to conductor J over the upper contacts of relay CK2 insures that the digit will be registered correctly on short pulses. The reason for this is the fact that relay CK2 is held up by the locking circuit of relays Ra ... Rf, as previously described, while the ground through the upper contacts of relay SPR insures that there is no double registration in case the incoming signal persists for a longer time than actually required for registration; that is, for a longer time than it takes relay PT to operate.

The registration in the sender of the succession of signal impulses transmitted from the transmitting station by the depression thereat of the digit keys of the key-set KS subsequent to the depression of key KP, depends upon the construction of the sender, the character of the settable registers therein and the manner in which these registers are to be set in response to the operation of the register relays in the combination of twos required by the frequency pulse code. Fig. 5 schematically shows the portion of a sender which, for instance, may be located in office X for the completion of a connection to a local station C, or to a telephone station B, the latter being located in office Y. If these stations are also to be reached from a call originating in office X through an operator's position provided with facilities for keying a series of direct current pulses representative of the called station designation, then the sender must be provided with corresponding facilities to register alternating current pulses when the call originates from an alternating current key-pulsing station and to register direct current impulses when the call originates at a direct current key-pulsing station. The register for a sender adapted to handle both types of calls is illustrated in Fig. 5 and will be considered hereinafter. Fig. 4, on the other hand, shows schematically the portion of a sender, which, for instance, might be used at office X for completing calls to a subscriber in that office only, such as subscriber C, when it is not necessary to accept calls from operators equipped with direct current key-sets or to complete calls to other offices, such as office Y. One of the characteristics of this register circuit, as compared with that of Fig. 5, is that it must always be supplied with a full complement of digit signals and that, having received them, it tells the sender to proceed with the call without awaiting for an ST or "start" signal to be transmitted or registered. Since such a signal may be received inadvertently, however, the register has been arranged to ignore it unless it should appear before the full quota of digit signals has been received, in which case a "reorder" indication will be given. These and other differences permit certain simplifications to be made in this case, which will be apparent from the more complete descriptions of the two arrangements that follow.

Considering first the registers of Fig. 4 (X wiring in Fig. 3) and assuming the same to be incorporated in a sender adapted to register only alternating current impulses of the character described (in which event relay SW will not be provided and conductors T1, R1 will be connected directly to the input terminals of pad AP), the seizure of the sender at the sender selector switch SS and the connection of the sender with the trunk will initiate circuit operations among which are, as said before, the connection of battery to conductors BAT1 and BAT2, and the operation of the steering relays TR1 and TRA by the momentary application of ground to conductor 20, whereupon both of these relays lock serially to ground on the left contacts of relay TRA while relay TR1 is furnished with a supplementary holding path over its No. 6 front contacts and conductor H to ground on the upper contacts of relay CK1 when the latter operates on the regular digit pulse. At the same time the other pairs of steering relays, TRB and TR2, TRC and TR3, etc., up to the final pair TRN and CI, of which only relays TRB, TR2, TRN and CI are shown, for the second and succeeding registers, are operated, one from the other in succession until all of them are operated and locked up. With the operation of relay TR1, the five signaling conductors A ... E (conductor F has a different connection in a settable register of the kind shown in Fig. 4) are connected, respectively, to the operating windings of the five relays 1 ... 5 constituting the register for the first digit. After relays KP2 and KP3 have been operated by a "KP" signal, obvious circuits are completed from ground on the upper contacts of the channel relays Ra ... Re operated in combinations of two according to the code given, over the appropriate two of the five conductors A ... E, two armatures and right front contacts of relay TR1 to the lower windings of the two corresponding relays of the five register relays 1 ... 5 of the first digit register. When the first digit is registered and relay CK1 is released, relay TR1 is released and the signaling conductors A ... E are advanced over back contacts of relay TR1 and front contacts of relay TR2 to the operating windings of the relays 1 ... 5 of the second digit register. At the same time, the operated relays in the first digit register are locked up to ground on the No. 7 normally made contacts of relay TR1, and conductor H is extended to relays TR2 and TRB. Similarly, when the second digit is registered and relay CK1 is released, relay TR2 releases and the five signaling conductors A ... E and conductor H are extended to the third group of steering and register relays, and so on until the last digit is registered, whereupon relay CI releases and opens conductor L to stop the reception of any further digit indications, thus preventing the reception of the ST signal, as previously indicated. If this signal should appear before the last digit is registered, however, it will cause the application of ground to conductors E and F. Since conductor F is connected to the reorder circuit, further registration will be stopped and a reorder signal will be sent back to the transmitting station as an indication of an error which must be corrected by retransmitting the whole number.

With this register arrangement, the registration of each digit is indicated by the operation of two relays in a particular register and it is possible to give a definite indication that the registration is completed, which may be accomplished by means of polarized marginal relay TO which operates over its primary winding (P) as soon as two register relays of the connected register close their locking circuits, as shown hereinafter, but which will not operate when only one relay of said register operates.

Thus when a digit signal comes in, say the signal of digit 9, the pulse code of which is frequencies $a$ and $e$, relay SPR operates to supply operating ground to the operate windings (P) of the channel relays Ra ... Rf. Relays Ra and Re operate and lock in response to the frequencies in the signal, and relays CK1 and CK2 also operate for the reasons already given. Ground applied to conductor H by relay CK1 short-circuits relay TRA which releases and thereby removes the ground it was supplying to the winding of relay TR1, but the latter remains locked to ground on conductor H over its No. 6 front contacts until relay CK1 releases. Circuits are now closed for register relays 1 and 5 of the first digit register, the circuit of the former being traced from ground on the upper contacts of relay Ra, conductor 21, No. 6 front contacts of relay KP3, conductor A, No. 1 front contacts of relay TR1, lower winding of relay 1 to battery; the circuit of relay 5 being traced from ground on the upper contacts of relay Re, conductor 7, No. 4 front contacts of relay KP2, conductor E, No. 5 front contacts of relay TR1, lower winding of relay 5 to battery. Relays 1 and 5, upon operating, close a path from battery through their respective upper windings and locking contacts, No. 7 front contacts of relay TR1, right contacts of relay TRA, winding (P) of relay TO, contacts of relay CKA, conductor K, lower contacts of relay CK3, which is normal since only two frequencies are present in the signal, to ground. Relay TO operates, disconnects the resistance ground being supplied over conductor J from resistance CH2 via the front contacts of relay SPR and/or relay CK2, to the operate windings (P) of the channel relays, and locks itself to said ground on conductor J via its armature and front contacts, secondary windings (S) to battery via contacts No. 2 of relay CI. (Since both the (P) and the (S) windings of relay TO cause said relay to operate, a biasing spring or other suitable means must be provided to release it.) If the signal is short and relay SPR releases before registration is completed, relays Ra and Re are, nevertheless, held operated by the ground supplied to conductor J through resistance CH2 and the upper contact of relay CK2 until relay TO operates to signify that the registration of the digit has taken place. If the signal remains on longer than the time required for the register relays and relay TO to operate, the channel relays Ra and Re release but relay TO, which has been locked up as previously described, remains operated until relay SPR releases at the end of the signal pulse.

When the channel relays Ra and Re release, relays CK1 and CK2 release also, the former disconnecting ground from conductor H to cause the release of relay TR1 which, in consequence, advances the signaling conductors A ... E over its Nos. 1 ... 5 back contacts, respectively, to the armatures of the Nos. 1 ... 5 contacts, respectively, of the next transfer relay TR2 from which they are extended via the front contacts of that relay to the register relays of the second digit register. The release of relay TR1 also advances conductor H over its No. 6 back contacts and the No. 6 front contacts of relay TR2 to the winding of that relay, and relay TRB, and, in addition, relay TR1 at its No. 7 contacts, opens the connection from the winding (P) of relay TO to the first digit register and provides a ground for locking the two operated register relays 1 and 5 in that register. The register circuit is now ready for the second digit signal, after the reception of which it advances to the third digit register and so on until all of the digits have been registered. When ground is removed from conductor H at the end of the final digit signal, relay CI is released, and since it opens lead L at its No. 1 contacts and, therefore, lead L1, further operation of relays Ra ... Rf in the receiving circuit is prevented. Relay CI, through its No. 2 contacts, also opens the locking battery for relay TO and by means of contacts not shown causes the sender to advance the call.

Should only one channel relay operate due to the presence of one frequency in the impulse produced, say, by some abnormal condition, the corresponding register relay would operate also, but the latter would not lock up since, with relay CK1 released, no ground would be applied to conductor H and relay TRA would not release in consequence thereof and no locking circuit for the register relay would be available through the primary winding (P) of relay TO. Should more than two channel relays operate, then relay CK3 would operate in addition to relays CK1 and CK2 for the reason already advanced and relay CK3, upon operating, would apply ground to conductor RO, completing thereby a circuit to a suitable "reorder" circuit which would function to cause the reorder signal to be sent back to the transmitting station, in meaning of which, to the operator thereat, would be to retransmit the entire number. Relay CK3, by breaking its lower contact, disconnects ground from conductor K to prevent relay TO from operating.

Relay CKA, which is of the slow-release type, is normally operated by ground on conductor M applied thereto through the back contacts of relay CK2. It is released when relay CK2 operates, and serves to delay the closing of the register locking circuit and hence the operation of relay TO, for a short interval in order to allow ample time for relay CK3 to function in case one or more interfering frequencies should cause the operation of more than the two channel relays which would be operated by a normal digit impulse.

Fig. 5 schematically shows the registering elements of a sender in which each of the digit registers comprises four relays instead of five. A sender of this type is available not only to the trunked connection from the distant transmitting station where alternating current keying is used, but also to a local operator at office X whose position is equipped for direct current keying of impulses by which to obtain the number of the called station as, for instance, the position typified by the cord CD equipped with a key-set DA, and the local trunk designated by the jack LJ. The impulses produced by the key-set DA are direct current impulses which are registered in what is essentially a four-unit code as compared with the direct five-unit code of the alternating current signals for the registers of Fig. 4 and, for a sender which must handle digits transmitted into it by either code, either a different set of registers must be provided for each code or one set of registers for both and a translating arrangement by which one code is changed into the other. For practical reasons the latter, or translating arrangement, is shown, and since the direct current pulse code is the basic one, the alternating current signal indications are converted into equivalent direct current pulse indications, the digit registers taking the direct current pulse code setting for the same digit whether the digit is transmitted by direct current pulses from the key-set DA or by alternating current pulses from the key-set KS.

The translator comprises the six relays TA . . . TF shown in the lower part of Fig. 5 but only a portion of their respective contact equipment and interconnecting wiring is shown. The six translator relays TA . . . TF are operated by the channel relays Ra . . . Rf over conductors A . . . F, respectively, when the latter relays operate after the "KP" signal has been received and relays KP2 and KP3 have been operated in consequence thereof, relay TA being operated by relay Ra, relay TB by relay Rb and so on up to and including relay TF which is operated by relay Rf.

In order to simplify the understanding of the operation of the translator, the table below is furnished to show, for each digit, what combination of translator relays is operated in accordance with the alternating current signal code and what register relay or combination of relays is operated thereby, these register relays being the same for signals in accordance with the direct current pulse code, which cause their operation by means of suitable indications placed on conductors TP, TM, RP and RM by the direct current key-pulsing circuit DCP.

| Digit | Translator Relays | Digit Register Relays | Leads Grounded For Direct Current Operation |
|---|---|---|---|
| 1 | TA, TD | 1 | TM. |
| 2 | TB, TD | 2 | TP. |
| 3 | TD, TE | 1, 2 | TM, TP. |
| 4 | TB, TE | 4 | RP. |
| 5 | TC, TD | 5 | RM. |
| 6 | TA, TC | 1, 5 | TM, RM. |
| 7 | TB, TC | 2, 5 | TP, RM. |
| 8 | TC, TE | 1, 2, 5 | TM, TP, RM. |
| 9 | TA, TE | 4, 5 | RP, RM. |
| 0 | TA, TB | None | None. |
| ST | TE, TF | 1, 4 | TM, RP. |

It will thus be seen from the above table that, with the four-relay digit register, the number of relays operated to indicate the different digits varies from none for the digit "0" to three for the digit "8" when relays 1, 2 and 5 are operated. If the relays are given appropriate numerical designations, this system has the advantage that the digit itself may be identified by adding up the designations of the operated register relays. It lacks, however, the positive indication that the registration of a digit has been completed, which is obtained with the five-relay digit register of Fig. 4 wherein two relays, and only two, are always operated per digit and a relay TO is made to respond to this operation. As a consequence, it is not possible to use a marginal relay TO, as in the register of Fig. 4, to indicate that the register is satisfied, but a timing circuit must be used to insure that the channel relay circuits to the several register relays are maintained long enough for the slowest relay of the register to operate. The timing interval is obtained from polarized relay PT which is made slow-operate by means of the condenser PTC and resistance PTR associated with the right winding (R) of the relay, to the joint terminal of both windings of which battery is connected, through the left contacts of relay ACP which, along with relay ON, is operated in any suitable manner when the sender is seized for use on calls using alternating current key pulsing. As long as ground is supplied to the right winding (R) over conductor M via the No. 1 contacts of relay TG from the lower contacts of relay CK2, relay PT is held in the released position by the current flowing through said right winding (R), during which time condenser PTC is, of course, short-circuited. But when ground is removed from conductor M by the operation of relay CK2, a charging circuit for condenser PTC is established from ground through resistance PTR, condenser PTC, right winding (R) of relay PT to battery on the left contacts of relay ACP. The charging current of the condenser is in the same direction as the current produced by the circuit completed by ground on conductor M so that, during the time that the flux produced by the charging current predominates over that of the current flowing through the left or operate winding (O) of the relay, the armature of said relay remains engaged to its contact to maintain ground to the operate windings of the channel relays via conductor L1, resistance CH2, conductor L, contacts of relay PT, conductor J to ground on the upper contacts of relay SPR and/or the upper contacts of relay CK2. When, however, the resulting flux drops below that due to the current flowing through the left winding (O) of relay PT, said relay operates and disconnects ground from the operate winding (P) of the channel relays with consequences already noted in connection with the register shown in Fig. 4.

The relays 1, 2, 4 and 5 of the individual digit registers are operated by grounds on conductors TM, TP, RP and RM, respectively, while the steering relays AC and AL, corresponding, respectively, to the relays TR1 and TRA of the register of Fig. 4, are controlled by ground on conductor TS. Relays AL and AC are operated in series by momentary ground on conductor 20' and locked up to ground over the left contact of relay AL, and at the same time the other pairs of steering relays (not shown) between AL and AC and the steering relays NL and NC for the final register are operated, one from the other in succession, until they are all operated and locked up. With relay AC operated the conductors TM, TP, RP and RM are connected to the operate windings of the relays in the first digit register.

When direct current pulsing is involved as, for instance, in establishing a call from a subscriber in office X via a local position thereat to another subscriber either in the same office or another office, in such cases the sender is connected to the local trunk terminating in jack LJ in response to the operator having seized said trunk by plugging cord CD therein. Cord CD has the usual facilities for connecting the key-set DA across the tip and ring of the trunk, for initiating the operation of circuits, by which the selected sender is connected to the trunk LJ via the crosspoints LSS1 and LSS2 at the sender selector switch SS through conductors TT and RR. Since, in this case, relay SW is normal, the trunk conductors, instead of being connected to the alternating current pulse receiver are connected to a direct current key-pulsing circuit DCP which responds to the key pulses and, in response to the operation of each digit key causes ground to be applied to conductors TM, TP, RP and RM in accordance with the digit keyed. The grounds on these leads then complete circuits to relays 1, 2, 4, and 5 of one of the digit registers (which one depending upon the number of pairs of steering relays which have been released as the call has progressed) causing the operation of said relays in accordance with the code given, said relays locking over their upper windings and contacts to ground on relay ON which is operated at this time. Since this part of the sender equipment and its operation form no part of this invention, no further description of its operation is considered necessary.

As before indicated, relays TA . . . TF operate on the two-at-a-time basis in accordance with the alternating current pulse code, and the connections through their contacts are such that each pair that corresponds to a digit code will set up a path to the proper conductors TM, TP, RM and RP. For simplicity, only the path for the translation and registration of the digit 1 in the first digit register is shown, concerning which, when relays TA and TD operate in response to the alternating current signal pulse of the digit 1, a circuit is completed for relay 1 of the first digit register, extending from battery through the lower winding of said relay, No. 1 front contacts of relay AC, conductor TM, No. 5 contacts of relay TD, No. 4 contacts of relay TA, to ground. Digit relay 1 operates over its lower winding and then locks over its upper winding and upper contacts to off-normal ground on relay ON.

Relays TA . . . TF, when operated in groups of twos according to the alternating current impulse code above given, also connect ground to the steering conductor TS, the path being traced from the right contacts of relay ACP, through a set of operated contacts on each of the two operated relays and a set of normal contacts on the unoperated relays of the translator.

Ground on conductor TS short-circuits relay AL, which releases, but it holds relay AC operated until the two operated relays of the translator release in response to the release of their associated channel relays, at which time relay AC will release and advance conductors TS, TM, TP, RM and RP to the next set of steering relays (not shown). In addition, and over obvious paths, the relays of the translator apply ground to the "reorder circuit" whenever relay TF operates with any of the other relays except relay TE. The purpose of this is to operate the "reorder circuit" and hence to cause a reorder signal to be sent back to the operator at the transmitting station under these circumstances, since the combination of frequency $f$ with any other frequency except $e$ (after the KP signal) is not an assigned code, and the reception of such a signal is therefore an error, which can be rectified only by retransmitting the whole number. The combination of relays TE and TF is the code of the "start" signal which is accepted in the same way as the digit signals. It is transmitted from the transmitting station by the depression of key ST thereat after all the digits are sent and, in the consequent operation of relays TE and TF, circuits are completed through the contacts of said relays to operate digit register relays 1 and 4, which in turn provide a signal for the sender to proceed with the setting up of the connection.

The circuit is made inoperative to the operation of a single translator relay by arranging the connections in such a manner that two translator relays must be operated in order to apply ground to conductors TS, TP, TM, RP and RM, and also by preventing the operation of relay PT, which is held released by ground supplied to its right winding (R) through normal contacts on relay CK2 and relay TG, neither of which will operate unless two channels have been energized (relay TG being under the control of relay CK1, which also requires that two channels be energized).

Considering, now, the operation of the register shown in Fig. 5, relay SPR, the channel relays Ra . . . Rf and relays CK1 and CK2 operate in the same manner as with the register of Fig. 4. In addition, the corresponding translator relays TA . . . TE operate as previously described and, when two relays are up, close ground to the proper conductors TP, TM, TS, RP and RM of the digit register relays, causing the release of relay AL and the operation of the required relay, or relays, in the first digit register while holding relay AC operated. At the same time, relay TG operates over the following path: ground through the make contacts of relay SPR and/or relay CK2, conductor J, normal contacts of relay PT, conductor L, make contacts of relay CK1, conductor H, No. 2 normally made contacts and winding of relay TG to battery. When operated, relay TG locks through its No. 2 front contacts to ground on conductor J from relay SPR and/or CK2, and through its No. 1 contacts opens the path between the winding (R) of relay PT and conductor M, from which ground has already been removed by the operation of relay CK2. Removing ground from conductor M starts the timing cycle for the operation of relay PT which, operating after condenser PTC is charged, breaks the connection between conductors J and L. If relay SP has already released, the two channel relays in the group of relays Ra . . . Rf which were operated by the incoming signal release and cause the release of all other above-mentioned relays except the register relays locked to ground on the contacts of relay ON. If relay SP is held up by a long incoming signal, all of the relays release except relays TG and PT, which wait until relay SP releases, due to the locking of relay TG to conductor J as described above. When relay AC releases, following the removal of ground from conductor TS, conductors TM, TP, RM, RP, and TS are transferred from the first digit register and steering relays to the second, and when the second and succeeding digits are received, the registration continues in a similar manner until the incoming "start" signal transmitted from the transmitting station by the depression of key ST thereat indicates that the last digit has been transmitted. The "ST" signal operates translator relays TE and TF, in turn operating relays 1 and 4 of a register succeeding the register which has taken the registration of the last digit transmitted (the number of digits which may be transmitted may vary depending upon the route and the called office) and a circuit closed through a pair of operated contacts on relays 1 to 4 of any register will operate a "start" circuit (not shown) which advises the sender that no more digits will be forthcoming and that, therefore, it may proceed with the necessary steps to complete the connection.

With either type of register sender, the registration of the required number of digits therein indicative of the route of the call (as for example, the name or number of the terminating exchange and/or the called number), causes the sender to become connected to a control circuit known as a "marker" in which, over contacts not shown on the digit registers, the necessary digits registration is transferred therein. In response to this registration, the marker then operates over certain control circuits to cause the selected trunk to become connected with another trunk to the terminating office or to the called line, whereupon the marker then disconnects and the sender proceeds to complete the connection at the terminating office or drops off if its work has been completed. Since these operations form no part of my invention, the same being well-known marker operations, they are not described herein.

While I have described my invention in connection with its specific application to two representative types of register senders for establishing automatic telephone connections, it is to be understood that various other applications and embodiments thereof may be made by those skilled in the art without departing from the spirit of the invention as defined within the scope of the appended claims.

What is claimed is:

1. In an alternating current signal receiver, the combination with means for amplifying received signals, of means responsive to each signal for altering the amplification factor of said first-mentioned means a predetermined interval after the beginning of each received signal regardless of the instensity of the signal.

2. In an alternating current signal receiver, the combination with means for amplifying received signals, of means responsive to each signal for raising the amplification factor of said first-mentioned means a predetermined interval after the beginning of each received signal regardless of the intensity of the signal.

3. In an alternating current signal receiver, the combination with means for amplifying received signals, of means responsive to each signal for raising the amplification factor of said first-mentioned means a predetermined interval after the beginning of each received signal regardless of the intensity of the signal.

4. In an alternating current signal receiver, the combination with means for amplifying received signals, of means responsive to each signal for altering the amplification factor of said first-mentioned means a predetermined interval after the beginning of the received signal regardless of the intensity of the signal, and for restoring the amplification factor to its original value upon the termination of each signal.

5. In an alternating current signal receiver, the combination with means for amplifying received signals, of means responsive to each signal for raising the amplification factor of said first-mentioned means a predetermined interval after the beginning of each received signal regardless of the intensity of the signal, and for restoring said amplification factor to its original value upon the termination of each signal.

6. In an alternating current signal receiver, the combination with a thermionic amplifier, of means responsive to a signal for altering the potential applied across the cathode-anode electrodes of the tubes of said amplifier a predetermined interval after the beginning of the received signal.

7. In an alternating current signal receiver, the combination with a thermionic amplifier, of means responsive to a signal for increasing the potential applied across the cathode-anode electrodes of the tubes of said amplifier a predetermined interval after the beginning of the received signal.

8. In an alternating current signal receiver, the combination with a thermionic amplifier, of means responsive to each signal for increasing the potential applied across the cathode-anode electrodes of the tubes of said amplifier a predetermined interval after the beginning of each received signal.

9. In an alternating current signal receiver, the combination with a thermionic amplifier comprising screen-grid tubes and a source of potential for the electrodes of said tubes, of a network responsive to a received signal for simultaneously raising the potential applied across the cathode-anode electrodes and to the screen electrodes of said tubes a predetermined interval after the beginning of the received signal, said network comprising a main circuit in series with the cathodes of said tubes, a first branch circuit connected to the screens of said tubes and second branch circuits connected to said main circuit, said second branch circuit including means responsive to a received signal for disconnecting said second branch circuit from said main circuit.

10. In an alternating current signal receiver, the combination with means for amplifying received signals, of means responsive to each signal for altering the amplification factor of said first-mentioned means a predetermined interval after the beginning of each received signal, storage devices, and means responsive to each of said amplified signals for operating said storage devices to register said signals.

EDMUND R. TAYLOR.

REFERENCES CITED

The following references are of record in the file of this patent:

UNITED STATES PATENTS

| Number | Name | Date |
|---|---|---|
| 2,324,816 | Born | July 20, 1943 |
| 1,724,082 | Green | Aug. 13, 1929 |
| 2,286,106 | Ritzman | June 9, 1942 |
| 2,158,198 | Prescott | May 16, 1939 |
| 1,859,565 | Keith | May 24, 1932 |
| 2,143,056 | Curtis | Jan. 10, 1939 |
| 2,276,037 | Hecht et al. | Mar. 10, 1942 |
| 2,316,354 | Moritz, Jr. | Apr. 13, 1943 |
| 2,237,742 | Lundstrom | Apr. 8, 1941 |